A. A. MICHELSON.
OPTICAL RANGE FINDER.
APPLICATION FILED SEPT. 24, 1918.
1,313,495.
Patented Aug. 19, 1919.
4 SHEETS—SHEET 1.
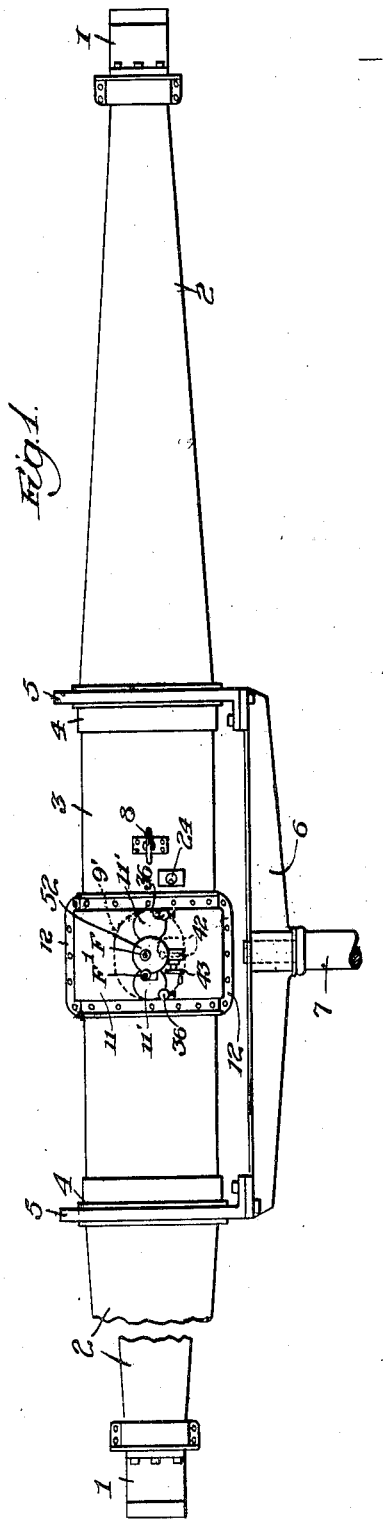
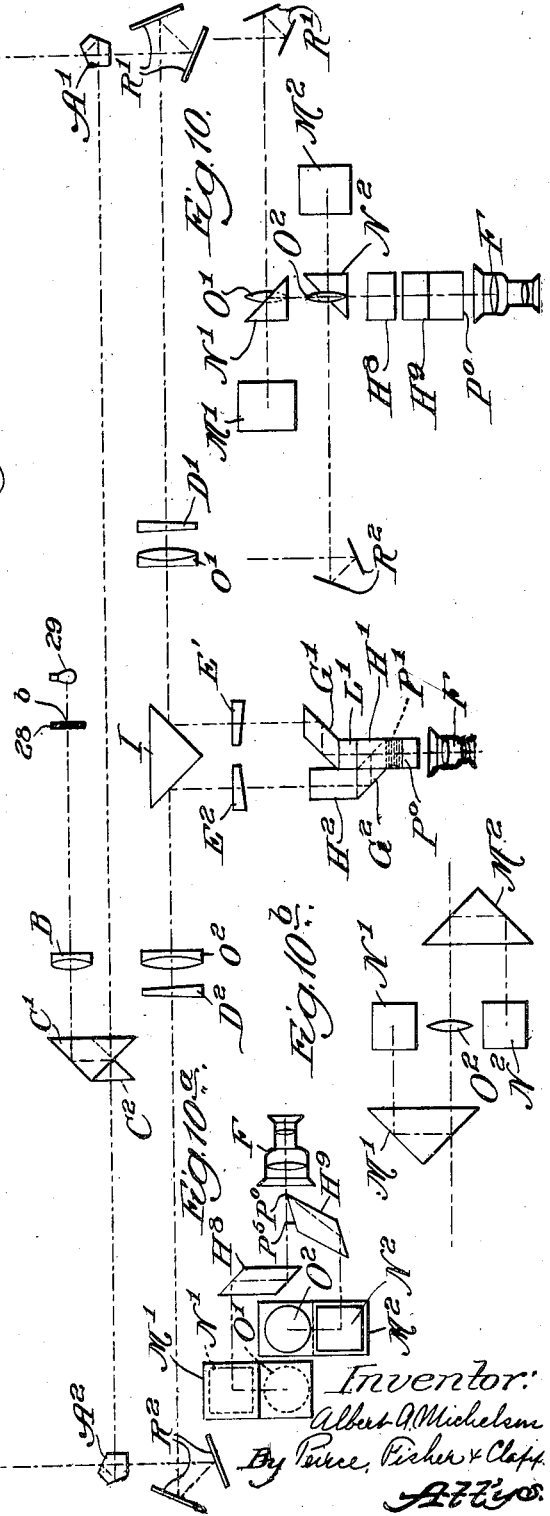
Inventor:
Albert A. Michelson
By Pierce, Fisher & Clapp
Attys.

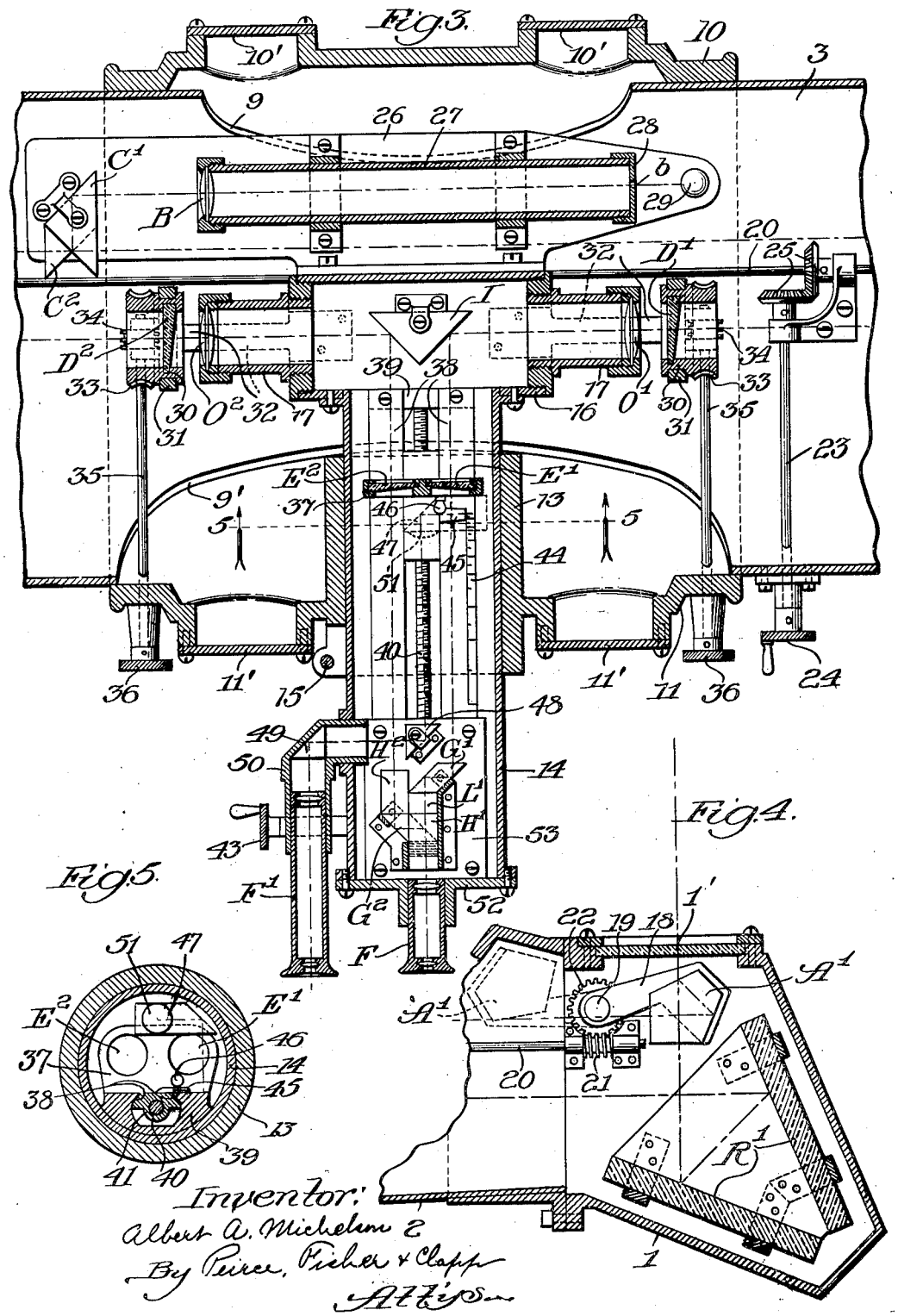

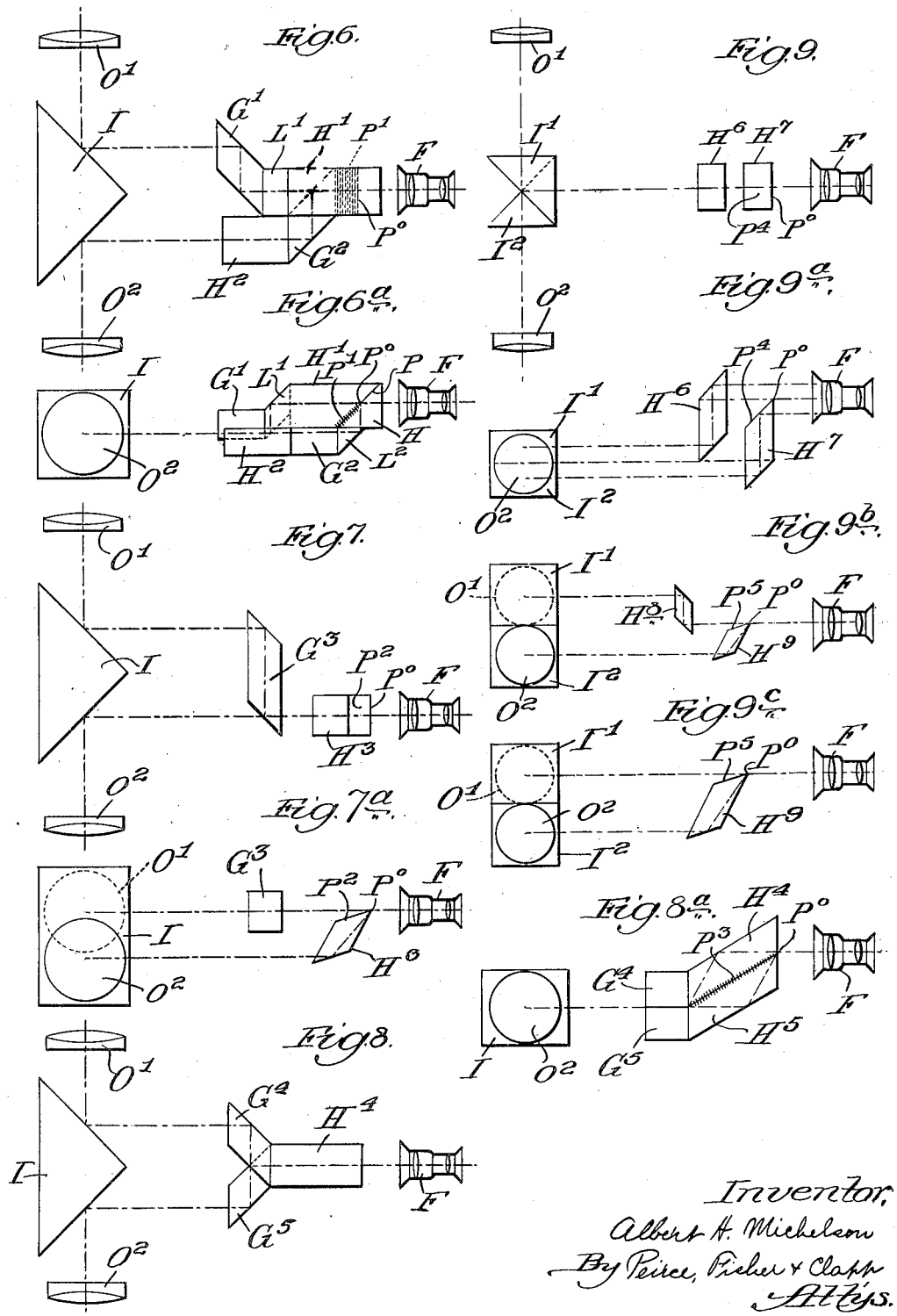

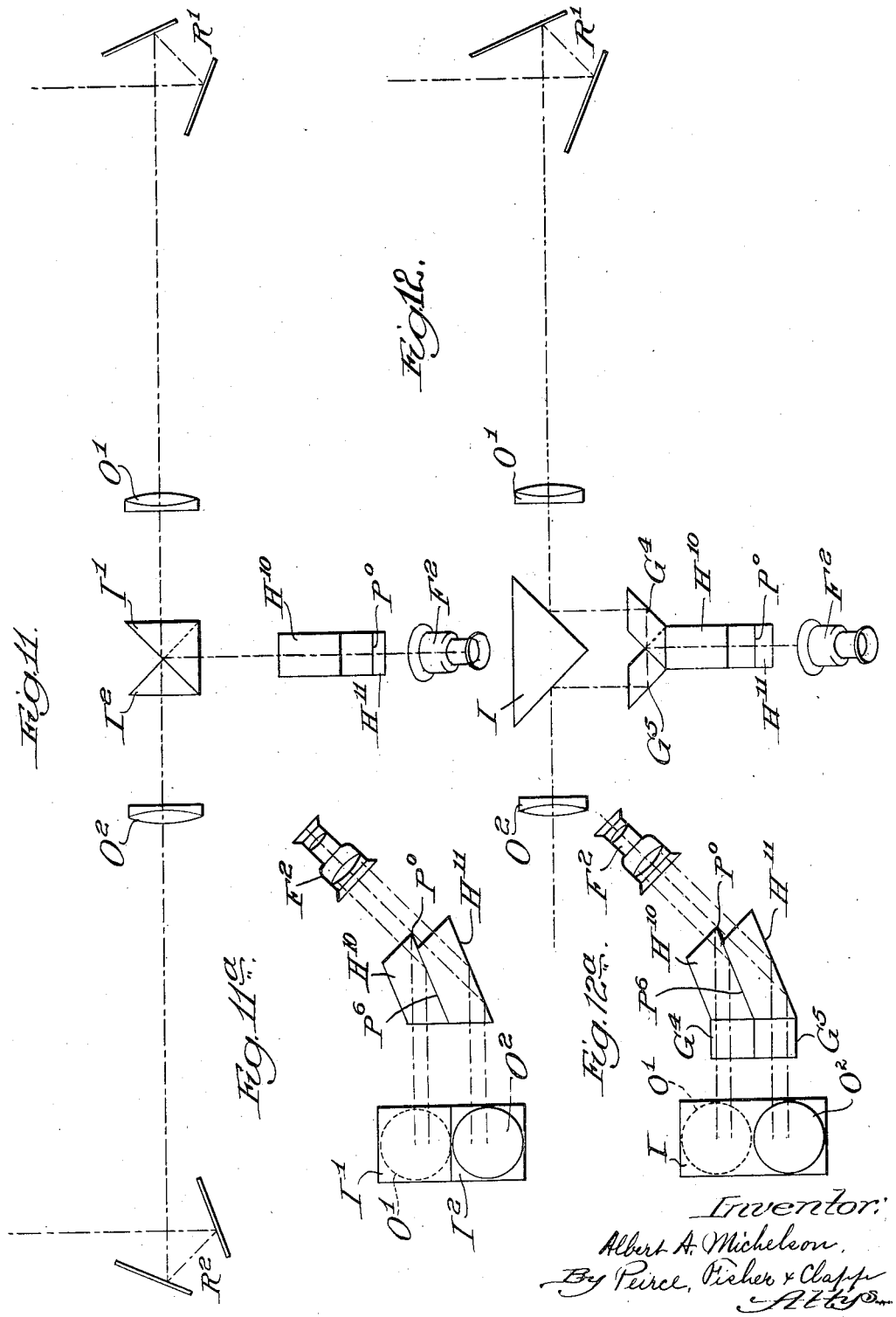

UNITED STATES PATENT OFFICE.

ALBERT A. MICHELSON, OF CHICAGO, ILLINOIS.

OPTICAL RANGE-FINDER.

1,313,495.   Specification of Letters Patent.   Patented Aug. 19, 1919.

Application filed September 24, 1918. Serial No. 255,459.

*To all whom it may concern:*

Be it known that I, ALBERT A. MICHELSON, a citizen of the United States, and a resident of Chicago, county of Cook, and State of Illinois, have invented certain new and useful Improvements in Optical Range-Finders, of which the following is a specification.

The invention relates to single observer range finders consisting of two telescopes arranged to project images of a distant object or target as viewed from the opposite ends of the instrument into the ocular field. The improvement seeks to prevent derangement of the instrument by locating the telescope objectives relatively near to the ocular prism system and mounting the objectives upon a common rigid support. The invention also seeks to provide improved adjusting means and an improved ocular prism system applicable to range finders working on the coincidence principle.

The invention consists in the features of improvement hereinafter set forth, illustrated in the different forms in the accompanying drawings and more particularly pointed out in the appended claims.

In the drawings, range finders operating on the coincidence principle are shown but certain features of the invention are also applicable to optical range finders working on the stereoscopic principle.

In the drawings, Figure 1 is a front elevation of one form of improved range finder. Fig. 2 is a diagrammatic plan view of the optical parts of the range finder. Fig. 3 is a plan section on an enlarged scale of the central portion of the range finder. Fig. 4 is a plan section of one end of the range finder. Fig. 5 is a detail section on the line 5—5 of Fig. 3. Figs. 6 and 6ª are plan and end elevations, respectively, of the objectives and the ocular prism system. Figs. 7 and 7ª, Figs. 8 and 8ª and Figs. 9 and 9ª are views similar to Figs. 6 and 6ª, showing different modifications. Figs. 9ᵇ and 9ᶜ are diagrammatic views in end elevation, showing further modifications. Figs. 10, 10ª and 10ᵇ are diagrammatic views in plan, end elevation and partial front elevation of another form. Figs. 11 and 11ª and Figs. 12 and 12ª are diagrammatic plan and end views of further modifications.

The objective systems of the two telescopes comprise end reflectors $R^1$ and $R^2$ and telescope objectives, preferably two in number, $O^1$ and $O^2$. The end reflectors are optical squares and each preferably comprises two plane reflectors rigidly mounted at an angle of 45° to each other and adapted to deflect the beam of light from the distant object through substantially a right angle inwardly along the main axis or base line of the instrument. These end reflectors are mounted in small casings 1 having windows 1' and fixed to the ends of laterally projecting portions 2 of the main outer casing of the instrument. These portions of the outer casing are preferably slightly tapered, as shown, and extend outwardly from a central cylindrical portion 3.

Heavy rings 4 fixed to the casing at the inner ends of the laterally projecting portions thereof are journaled in the ends or bearing rings 5 of a yoke 6 to permit the adjustment of the instrument upon a horizontal axis parallel to the base line of the instrument. The yoke, in turn, is swiveled to a suitable stand or support 7 to permit the adjustment of the instrument upon a vertical axis. A handle 8 fixed to the central portion of the casing adjacent the center of the instrument is used to effect the movements thereof about the horizontal and vertical axes to direct the instrument toward the target.

The beams of light from the end reflectors are received by the two objectives $O^1$ and $O^2$ and an intermediate reflector or reflectors are preferably employed to deflect the beams outwardly to a suitable ocular prism system. To avoid derangement of the instrument, the objectives are located relatively near to the central portion of the instrument and at considerably greater distances from the end reflectors and the objectives are mounted upon a common rigid frame which is supported independently of the laterally projecting supports or portions of the casing that carry the end reflectors.

In the preferred construction shown, the cylindrical central portion 3 of the casing is provided midway between its ends and at its front and back portions with openings 9 and 9', and a split supporting ring formed of front and back half-sections 10 and 11 is mounted on the casing over the openings 9 and 9'. The sections of the supporting ring are provided with abutting flanges 12 at their upper and lower ends, which receive the fastening bolts by which the sections are secured together and clamped upon the main casing of the instrument. One or the other of the sections, preferably the back section 11, of the supporting ring is also bolted to the main casing, but one of the sections, preferably the front section 10, can be removed by disconnecting the bolts extending through the flanges 12, so that access can be had to the parts at the central portion of the casing through the opening 9. Preferably, also, the front and back ring sections are provided with small openings or hand holes covered by plates 10′ and 11′ which may also be used to afford access to the parts at the central portion of the instrument. The objectives, intermediate reflectors and the ocular prism system are mounted on a frame arranged within the main casing and carried by the central supporting ring and the parts are preferably so arranged that by removing the back section 11 of the ring, this frame and the parts carried thereby can be removed for repairs or the like through the opening 9′.

In the construction shown, the central portion of the back section 11 of the supporting ring is provided with an integral sleeve 13 disposed transversely to the axis of the main casing and which is arranged to receive a tube 14. The outer portion of the sleeve is split at one point and a clamp screw 15 connects the split portions so that the tube 14 can be securely clamped in position. A rigid box-like frame 16 is securely fixed on the inner end of the tube and carries at its ends cylindrical casings 17 within which the objectives $O^1$ and $O^2$ are mounted, with their optical axes in line with or parallel to the base line of the instrument. The ocular prism system, the ocular and the measuring and adjusting devices are preferably mounted upon the central rigid frame or support comprising the tube 14 and the box-like part 16. The ocular and the ocular prism system are mounted at the forward end of the tube 14 and, as stated, an intermediate reflecting prism or prisms interposed between the objectives direct the light beams outwardly thereto. The intermediate reflector preferably comprises a prism I having two external reflecting faces arranged at right angles to the sighting plane and at angles of 45° to the base line, these surfaces being arranged to receive the beams from the objectives $O^1$ and $O^2$ and direct them forwardly to the ocular prism system and ocular at the end of the tube 14. This intermediate reflector is suitably secured in position in the central portion of the box-like frame 16.

In this arrangement, the objectives are, as stated, located adjacent the center of the instrument and have a relatively short focal length as compared to the length of the base line. For example, the base line can be 15 feet or more and the focal length of the objectives 20 or 24 inches and, with the arrangement shown, the objectives need only be about 20 inches or less apart. Furthermore, since the objectives are mounted upon a common rigid central support, which is independent of the laterally projecting supports for the end reflectors, the twisting or deflecting of the outer casing cannot cause any relative movement between the objectives and the instrument cannot be readily deranged in this way. Again, since the end reflectors are optical squares, the shifting thereof relatively to the objective and ocular prism systems will not derange the instrument. The construction is such that the instrument need not be heavy and unwieldy and at the same time, the optical parts are so mounted that derangement of the instrument cannot be readily effected.

Adjusting means are preferably provided and comprise optical squares arranged in front or in advance of the main end reflectors, together with means for projecting beams of light from an optical mark or marks to said optical squares and thence to said end reflectors. As shown, the adjusting optical squares comprise small pentaprisms $A^1$ and $A^2$ which, in operative position, are arranged in the lower central portions of the end casings 1 which carry the main end reflectors R and $R^1$. These adjusting optical squares are preferably shiftable into and out of operative position and for this purpose, each is mounted upon an arm 18 carried upon a short vertical shaft 19. A shaft 20 extending longitudinally through the main casing is connected at each end to one of the shafts 19 by a worm 21 and a worm wheel 22. A short, transverse shaft 23 arranged adjacent the center of the main casing is provided on its outer end with a hand wheel 24 and its inner end is connected by a pair of beveled gears 25 to the longitudinal shaft 20. By this means, each of the adjusting optical squares $A^1$ and $A^2$ can be shifted between its operative position, shown in full lines in Figs. 2 and 4, and its inoperative position, shown in dotted lines in Fig. 4.

A plate 26 mounted upon the front side of the box 16 carries a tube 27 having at one end a cap or glass 28 provided with a vertical slit or adjusting mark $b$ adapted to be illuminated by a small electric lamp 29 mounted on the end of the plate 26. The opposite end of the tube 27 carries an objective B which is arranged to project a beam of light from the slit against the reflecting surfaces of a pair of superposed prisms $C^1$ and $C^2$ mounted upon the end of the plate 26 in front of the objective. The prism $C^1$ has two reflecting surfaces at right angles to each other and is arranged to project a portion of the beam of light from the objective B to the optical square $A^1$. The prism $C^2$ is rhomboidal, has two substantially parallel reflecting surfaces and is arranged to direct another portion of the beam of light from the objective B to the adjusting prism A² at the left hand end of the instrument. These light beams are projected by the adjusting optical squares A¹ and A² onto the end reflectors R, R¹, thence through the main optical system of the instrument to the ocular, so that images of the slit $b$ are thus formed in the ocular field. Since slight relative movements of the adjusting reflectors or optical squares A¹ and A² do not affect the parallelism of the beams emitted thereby, the images of the slit or mark thus formed may be employed to adjust the instrument.

The adjusting mark or marks $b$ are located at the focus of the objective B and are so arranged that an artificial infinity is produced. That is to say, they are so arranged that, when the measuring devices of the instrument are set to indicate an infinite distance, the images of the slit will appear to coincide if the instrument is in proper adjustment. If the instrument has become deranged in any way, the images will not coincide under such circumstances and the correcting devices can then be manipulated to effect a proper readjustment. If desired, in order to compensate for any imperfection of the reflecting prisms C¹ and C², two marks or slits, one above and the other below the optical axis of the objective B, may be provided.

In the preferred construction shown, the means for correcting or readjusting the instrument comprise two prisms D¹ and D² which are mounted in advance of the objectives O¹ and O² and are rotatable in planes at right angles to their optical axes. For this purpose, they are fixed in sleeves 30, which in turn are rotatably mounted in rings 31 fixed to supports 32 that project outwardly from the lower end portions of the box 16. Worm wheels 33 fixed to the sleeves 30 are arranged to engage worms 34 on the inner ends of shafts 35. The outer ends of the latter are journaled in the back section 11 of the central supporting ring and are provided with adjusting buttons 36 on their outer ends. The adjusting prisms D¹ and D² may be employed to properly position the images in the ocular field and to readjust the instrument in case it becomes deranged.

The measuring devices are preferably located between the intermediate reflecting prism I and the ocular prism system at the inner and outer ends, respectively, of the tube 14. In the preferred construction shown, the measuring device comprises two oppositely disposed prisms E¹ and E² adjustably mounted in the paths of the light beams that are projected outwardly from the intermediate reflector I. These prisms are mounted in a frame 37 which is slidably mounted in ways 38 formed upon a support 39 fixed to the lower portion of the tube 14. A screw 40 journaled in the support 39 engages a nut 41 formed upon a downwardly projecting part of the slide 37 and the forward end of the screw is connected by a worm and worm wheel, or by spiral gears 42, to an adjusting wheel 43, by means of which the slide 37 and the adjusting prisms can be moved along the paths of the two light beams.

One of the guideways 38 is provided with a scale 44 and the slide 37 has a coöperating pointer 45. A small electric lamp 46 mounted on the slide illuminates the scale and a reflecting system is provided for conducting a light beam from the scale to an ocular arranged adjacent the main ocular of the instrument.

In the construction shown, a prism 47 mounted on the upper portion of the slide 37 is provided with reflecting surfaces which are arranged to deflect a beam of light from the scale first laterally and then outwardly along the upper central portion of the tube 14 and against the deflecting surface of a prism 48. The latter deflects the beam laterally upon the reflecting surface of a prism 49 which is carried in a small L-shaped tube 50 mounted on one side of the tube 14. The outer portion of the tube 50 is provided with an ocular F¹ which may be thus used to observe the scale. A lens 51 on the face of the prism 47 is arranged to transmit the ray of light emerging therefrom in parallel pencils, so that the shifting of the slide 37 will not disturb the focal adjustment of the ocular F¹.

The parts thus far described may be employed in an optical range finder operating either on the coincidence or upon the stereoscopic principle. Preferably, however, the optical prism system is provided with a separating surface or edge and is arranged to unite portions of the images formed by the two objective systems in the ocular field, the range being determined by adjusting the measuring devices until the two part images coincide to form a complete image. In the construction shown, the ocular F is mounted upon a circular head or plate 52 which covers the outer end of the tube 14 and the ocular prism system is mounted upon a plate 53 fixed to the outer ends of the guides 38. Oculars F and F¹ are closely adjacent and are readily viewed by the right and left eyes respectively of the observer.

The optical prism system for uniting the two part images in the ocular field can be variously arranged. In the arrangement shown in Figs. 2, 6 and 6ª, two rhomboidal prisms G¹ and G² are interposed in the two light beams which are directed outwardly by the intermediate reflecting prism I. Each of these rhomboidal prisms has two parallel reflecting surfaces at right angles to the sighting plane and at 45° to the base line and are arranged to bring the two light beams into the same vertical plane. These rhomboidal prisms are vertically offset but preferably overlap in vertical direction, as shown in Fig. 6ª, so that the axes of the two light beams will fall well within the upper and lower surfaces thereof. A right angled prism H is arranged in advance of the ocular and has a face P which is inclined to the sighting plane and is substantially parallel to the base line of the instrument. The inclined face P of the prism H abuts against and is cemented to the corresponding inclined face of a prism $H^1$ and the lower half portions of these abutting faces are silvered and form a separating surface $P^1$ the rearward edge of which forms a separating edge $P^0$ and is located substantially in the focus of the ocular F and is substantially parallel to the base line. A small rhomboidal prism $L^1$ cemented to the front vertical face of the prism $H^1$ is provided with parallel reflecting surfaces inclined to the sighting plane and is arranged to receive the light beam from the rhomboidal prism $G^1$ and direct the same forwardly onto the separating surface $P^1$ and across the separating edge $P^0$ to the ocular F. A small right angled prism $L^2$ cemented to the lower horizontal face of the prism H is arranged to receive the beam of light from the rhomboidal prism $G^2$ and deflect the same upwardly against the reflecting separating surface $P^1$ from which it is deflected outwardly to the eye piece. The parts are so arranged that the central axes of the two beams of light are directed upon the separating edge $P^0$ and across each other at an angle. The separating surface thus deflects the lower half portion of the beam of light from the right hand end of the instrument and the lower half portion of the beam from the left hand end and permits the passage of the upper portions of the beams undeflected past the separating edge $P^0$. The eye piece or ocular is arranged to receive the undeflected or upper half portion of the beam from the right hand end of the instrument and the deflected or lower half portion of the beam from the left hand end. By adjusting the measuring prisms $E^1$ and $E^2$, as well understood, the two half images can be brought into coincidence and the range determined by the scale associated with the measuring prisms. In order that both beams shall pass through the same amount of glass, a rectangular glass piece $H^2$ is cemented to the front face of the prism $G^2$.

In the form shown in Figs. 7 and 7ª, a single rhomboidal prism $G^3$ is employed to bring the light beam from the right hand end of the instrument into the same vertical plane with that from the left hand end and to direct the same onto the separating surface $P^2$ which covers substantially one-half the ocular field, so that the upper half portion of the light beam from the right hand end of the instrument passes over a separating edge $P^0$ to the ocular. The separating surface $P^2$ and edge $P^0$ are formed upon a rhomboidal prism $H^3$, the lower surface of which is parallel to the separating surface and is arranged to direct the beam of light from the left hand end of the instrument upwardly against the separating surface with its axis intersecting the separating edge. In this form, the separating surface $P^2$ need not be silvered. The lower half portion of the beam from the left hand end of the instrument is internally and totally deflected by the surface $P^2$ to the ocular and the lower half portion of the beam from the right hand end of the instrument is externally deflected by the surface $P^2$ from the ocular field. Preferably, as shown in this form, the two objective systems are vertically offset, as indicated in Fig. 7ª. The angles of the prism $H^3$ are preferably 45° and 135° but the prism is preferably slightly inclined, as shown in Fig. 7ª, so that the central axis of the beam from the left hand end of the instrument will lie well within the surfaces of the prism.

In the form shown in Figs. 8 and 8ª, the light beams are brought into the same vertical plane by two superposed rhomboidal prisms $G^4$ and $G^5$ and the beams of light are received therefrom by two rhomboidal prisms $H^4$ and $H^5$ having parallel reflecting surfaces inclined to the sighting plane and parallel to the base line. The separating surface $P^3$ intermediate the prism $H^4$ and $H^5$, and as in the other forms described, has a separating edge $P^0$ located substantially in the focus of the eye piece F and substantially parallel to the base line of the instrument. In this form, the separating surface $P^3$ is preferably silvered.

In the form shown in Figs. 9 and 9ª, the two light beams are directed outwardly at right angles to the base line by two superposed right angled prisms $I^1$ and $I^2$ onto the lower internal reflecting surfaces of two vertically disposed rhomboidal prisms $H^6$ and $H^7$ which have parallel reflecting surfaces inclined to the sighting plane and parallel to the base line. The upper surface of the prism $H^7$ forms a separating surface $P^4$ having a separating edge $P^0$ and located, like the separating surfaces of the other prisms, over one-half the field of the ocular.

The form shown in 9ᵇ, like that shown in Figs. 9 and 9ª, has two rhomboidal prisms $H^8$ and $H^9$, the latter being provided with a separating surface $P^5$ and a separating edge $P^0$. In this form, the objective systems are vertically offset and the rhomboidal prism H⁸ is arranged to deflect the right hand beam downwardly and then outwardly. The prism H⁹ in this form is disposed in slightly inclined position.

The arrangement shown in Fig. 9ᶜ is similar to that shown in Fig. 9ᵇ, except that the prism H⁸ is omitted and the reflecting prism I¹ is arranged to directly project the right hand light beam onto the separating surface P⁵ with its upper half portion passing over the separating edge P⁰.

In the form shown in Figs. 10, 10ᵃ and 10ᵇ, the objectives O¹ and O² are arranged closely adjacent one in front of the other and preferably in a common plane at right angles to the base line of the instrument. The end reflectors R¹ and R² are similarly offset one in front of the other in the sighting plane. The light beams from the objectives pass to two compound return reflecting prisms M¹ and M² and thence to two simple reflecting prisms N¹ and N², one located above the objective O¹ and the other below the objective O² and by which they are directed outwardly to the prisms H⁸ and H⁹. The latter are similar to the corresponding prisms of the form shown in Fig. 9ᵇ and unite the part images in the field of the eye piece F. In this form, the objectives, as stated, are arranged closely adjacent each other and can be very securely held against relative movement.

In the modification shown in Figs. 11 and 11ᵃ, as in the forms shown in Figs. 9ᵇ and 9ᶜ, the objectives are vertically offset and the light beams therefrom are deflected outwardly by the intermediate superposed reflecting prisms I¹ and I² onto the lower internal reflecting surfaces respectively of two superposed coincidence prisms H¹⁰ and H¹¹. Each of the latter prisms has but a single, internal, totally reflecting surface which deflects the light beam in a vertical plane and directs the same upwardly to an eye piece or ocular F² at an angle of substantially 45° to horizontal, the axis of the ocular being similarly disposed. Each of the prisms H¹⁰ and H¹¹ has a substantially vertical entrance surface and an inclined exit surface that are disposed substantially at right angles to the paths of the light beams passing therethrough and substantially at angles of 67½° to the lower inclined reflecting surface of the prism. The adjacent faces of these prisms are not cemented together and the lower face of the upper prism forms a separating surface P⁶ that need not be silvered, and the outer or rearward edge of the upper prism between its reflecting and exit surfaces forms a separating edge P⁰. The rearward or exit portion of the upper prism H¹⁰ preferably projects beyond the adjacent end of the lower prism H¹¹, and the lower reflecting surfaces of the coincidence prisms are arranged to direct complementary portions of the light beams from the opposite ends of the instrument across the separating edge P⁰ to an eye piece F². In this arrangement there are but two reflections of each light beam in the central prism system, no silvering of the coincidence prisms is required, and the images, as viewed by the eye piece, are both erect.

A similar arrangement of coincidence prisms can be employed in connection with an intermediate reflecting prism I having external reflecting surfaces, as shown in Figs. 12 and 12ᵃ. But in this form, as in the forms shown in Figs. 6 and 8, intermediate, two rhomboidal prisms G⁴ and G⁵ are used to bring the light beams into substantially the same vertical plane.

Obviously, changes may be made in the details set forth without departure from the essentials of the invention as defined in the claims.

I claim as my invention:—

1. An optical range finder comprising two compound end reflectors, a central ocular reflecting system, two telescope objectives having axes substantially parallel to the base line and arranged relatively near to said central reflecting system and at considerably greater distances from said end reflectors, a casing having laterally projecting portions for supporting said end reflectors, and a short, inner, rigid frame whereon said objectives are mounted, said frame having central supporting means independent of said laterally projecting portions.

2. An optical range finder comprising a central supporting yoke, a casing mounted therein and comprising a central portion and end portions projecting laterally from said yoke, compound end reflectors carried by said laterally projecting portions, a central ocular, an ocular prism system, two telescope objectives located relatively near to the center of the instrument and at considerably greater distances from said end reflectors, and an inner rigid frame whereon said objectives and said ocular prism system are mounted, said frame being shorter than said yoke and removably mounted within the central portion of said casing.

3. An optical range finder comprising a central supporting yoke, a casing mounted therein and having portions projecting laterally from said yoke, compound reflectors at the ends of the projecting portions, a central ocular, an ocular prism system, two objectives located relatively near to the center of the instrument and at considerably greater distances from said end reflectors, and a central rigid frame supported in said casing independently of said laterally projecting portions and whereon said objectives are mounted.

4. An optical range finder comprising a casing, compound reflectors mounted at the ends of said casing, a short rigid frame, a central support for holding said frame in position in said casing, and objectives and an ocular system mounted on said frame.

5. An optical range finder comprising an outer casing, compound reflectors mounted at the ends of said casing, a supporting ring centrally mounted on said casing, and objectives and an ocular reflecting system carried by said ring.

6. An optical range finder comprising an outer casing, reflectors at the ends of said casing, a yoke whereon said casing is journaled, a central supporting ring mounted on said casing between the ends of said yoke, and objectives, an ocular reflecting system and measuring and adjusting devices arranged in said casing and carried by said ring.

7. An optical range finder comprising an outer casing, compound reflectors mounted at the ends of said casing, a supporting ring centrally mounted on said casing and having a sleeve at right angles to the base line of the instrument, a tube mounted in said sleeve, a frame fixed to the inner end of said tube, objectives and intermediate reflecting surfaces mounted on said frame, and an ocular and an ocular prism system carried by said tube.

8. An optical range finder comprising an outer casing, reflectors at the ends of said casing, the latter having a central opening, a split supporting ring mounted on said casing and extending over said opening, a frame mounted on said ring and extending through said opening into the casing, and objectives, an ocular and an ocular reflecting system carried by said frame.

9. An optical range finder comprising two compound end reflectors, two telescope objectives arranged relatively near and on opposite sides of the center of the instrument and at considerably greater distances from said reflectors, said objectives having their axes substantially parallel to the base line of the instrument, a common central ocular, inclined reflectors arranged between said objectives for directing the light beams therefrom outwardly to said ocular, a casing having laterally projecting portions for carrying said end reflectors, and a common central support for said objectives rigidly mounted in said casing.

10. An optical range finder of the coincidence type comprising a casing having compound reflectors at the ends of said casing, a central support mounted in said casing and arranged at substantially right angles to the base line of the instrument, an ocular at the outer end of said support, two telescope objectives mounted on the inner end of said support with their axes substantially parallel to the base line, intermediate reflectors for directing the light beams from said objectives outwardly to said ocular, and a coincidence prism having a separating edge arranged at the outer end of said support adjacent and in front of said ocular.

11. An optical range finder of the coincidence type comprising a casing, two compound reflectors at the ends of said casing, a central support mounted in said casing substantially at right angles to the base line of the instrument, two telescope objectives and intermediate reflectors mounted at the inner end of said support, and a coincidence prism and a common ocular mounted at the outer end of said support.

12. A coincidence range finder comprising an outer casing, compound end reflectors carried thereby, a short, rigid inner frame, two telescope objectives mounted at the opposite ends of said short inner frame, a central support for holding said frame rigidly in position in said casing, a common ocular, intermediate reflectors for directing the light beams from said objectives outwardly to said ocular, and a coincidence prism arranged adjacent and in front of said ocular.

13. An optical range finder comprising two end reflectors, two telescope objectives, an ocular prism system, intermediate reflectors for deflecting the light rays from said objectives outwardly to said ocular prism system, an outer casing carrying said end reflectors and having a central opening, and a supporting frame within said casing and removable through said opening whereon said objectives, ocular prism system and intermediate reflectors are mounted.

14. An optical range finder comprising end reflectors, two telescope objectives, a common ocular, an intermediate prism having external reflecting surfaces for directing the light beams outwardly toward said ocular, and an ocular prism system for uniting the images in the field of the ocular.

15. A coincidence range finder comprising two objective systems, a common ocular, and a coincidence prism system arranged in front of and adjacent said ocular and comprising a prism having an internal, totally reflecting surface inclined to the sighting plane and intersecting its exit surface at a separating edge lying substantially in the image plane of the ocular, said internal reflecting surface being arranged to deflect a portion of one light beam past said edge to said ocular and said prism being arranged to permit the passage to the ocular of a portion of the other light beam undeflected thereby.

16. An optical range finder of the coincidence type comprising two end reflectors, two telescope objectives, a common ocular, intermediate reflectors for directing the light beams from said objectives outwardly to said ocular, and a coincidence prism system arranged adjacent and in front of said ocular and comprising two substantially parallel, internal, totally reflecting surfaces inclined to the sighting plane and one of which forms a separating surface and intersects an exit surface of said coincidence prism system at a separating edge which lies substantially parallel to the base line and substantially in the focus of said ocular.

17. A coincidence range finder comprising two objective systems, intermediate reflecting surfaces for directing the light beams outwardly substantially at right angles to the base line, a common ocular having its axis substantially at right angles to the base line and inclined downwardly with respect to the sighting plane, a coincidence prism system having two substantially parallel, internal, totally reflecting surfaces inclined to the sighting plane, one of said surfaces intersecting an exit surface at a separating edge lying substantially in the focus of the ocular and substantially parallel to the base line and said internal, totally reflecting surfaces being arranged to receive the light beams from said intermediate reflecting surfaces, deflect the same in vertical planes and direct them past said separating edge to said ocular.

18. An optical range finder comprising two objective systems, a common ocular, and an ocular prism system provided with a totally reflecting, separating surface inclined to the sighting plane and having a separating edge lying substantially in the focus of the ocular and substantially parallel to the base line, and means for directing the light beams from the opposite ends of the instrument onto opposite sides of said separating surface, the latter being arranged to deflect a portion of one beam to said ocular and permit the passage to the ocular of a portion of the other beam undeflected thereby.

19. An optical range finder comprising two objective systems, a common ocular, and a central prism system provided with a reflecting, separating surface inclined to the sighting plane, lying wholly on one side of the axis of said ocular and having a separating edge substantially in the focus of said ocular and substantially parallel to the base line, said prism system having other reflecting surfaces for deflecting the two light beams in planes parallel and at right angles respectively to the sighting plane and thereby directing the same upon said separating edge.

20. A horizontal optical range finder comprising end reflectors, two telescope objectives, a common ocular, an intermediate prism having external reflecting surfaces for directing the two light beams outwardly toward said ocular, and an image uniting prism system having a separating edge and reflecting surfaces for bringing the two light beams into substantially the same vertical plane and for directing the same onto said separating edge.

21. A horizontal optical range finder comprising end reflectors, two telescope objectives, a common ocular, an intermediate prism having external reflecting surfaces for directing the two light beams outwardly toward said ocular, and an image uniting prism system provided with a separating surface inclined to the sighting plane and having a separating edge parallel to the base line, said prism system having other reflecting surfaces for bringing the two light beams into substantially the same vertical plane and for directing the same onto said separating edge at an angle to each other.

22. A coincidence range finder comprising two objective systems, a common ocular and a central prism system comprising a prism having reflecting and exit surfaces meeting at an edge which is arranged substantially parallel to the base line of the instrument and substantially in the focus of the eye piece, with said reflecting surface inclined to the sighting plane and said central prism system having other reflecting surfaces for directing a portion of one light beam past said edge to the ocular and a complementary portion of the other light beam onto said reflecting surface and thence to the ocular.

23. A coincidence range finder comprising two objective systems, intermediate reflecting surfaces for directing the light beams outwardly substantially at right angles to the base line, a common ocular, and two superposed coincidence prisms each having a single reflecting surface inclined to the sighting plane, one of said prisms having a separating edge formed by the intersection of its reflecting and exit surfaces and lying substantially in the focus of the ocular and substantially parallel to the base line, and the reflecting surfaces of said coincidence prisms being arranged to receive the light beams from said intermediate reflecting surfaces, deflect the same in vertical planes and direct them past said separating edge to said ocular.

24. In an optical range finder, the combination with two end reflectors, objectives, an ocular prism system and a measuring device, of two adjusting optical squares arranged in advance of said end reflectors, an adjusting mark, and an objective and a reflecting prism system for projecting light beams from said mark to said optical squares.

25. In an optical range finder consisting of two telescopes, the combination with the objective systems, of two adjusting optical squares shiftable into and out of operative position in advance of said objective systems, an adjusting mark, and means including an objective and a reflecting prism system for directing light beams from said mark to said adjusting optical squares and thence into said objective systems.

26. In an optical range finder consisting of two telescopes, the combination with a casing, end reflectors, objectives and an ocular system, of two adjusting optical squares in said casing and shiftable into and out of operative position in advance of said end reflectors, an adjusting mark, an objective for projecting a beam of light therefrom, and two superposed prisms interposed in the light beam from said objective and arranged to deflect different portions thereof to said optical squares respectively.

ALBERT A. MICHELSON.